United States Patent Office 3,525,706
Patented Aug. 25, 1970

3,525,706
STABILIZED PIGMENTED POLYCARBONATE RESIN
Thornton R. Calkins, Pittsfield, Mass., assignor to General Electric Company, a corporation of New York
No Drawing. Filed Jan. 22, 1968, Ser. No. 699,295
Int. Cl. C08g 51/04; C08h 1/02
U.S. Cl. 260—37                                           3 Claims

ABSTRACT OF THE DISCLOSURE

An aromatic polycarbonate composition that is color stable, which composition consists of an aromatic polycarbonate resin having in admixture therewith 0.01–4.0 weight percent of a pigment, 0.001–0.5 weight percent of an organic phosphite and 0.001–0.03 weight percent of boric acid, all of which are based on the weight of the aromatic polycarbonate resin.

---

This invention is directed to a pigmented color stable aromatic polycarbonate resin composition and in particular an aromatic polycarbonate resin composition containing therein a pigment, an organic phosphite and boric acid.

In the art, many thermoplastic polymers require stability both in heat and color since the polymer per se is not stable. Many different additives have been found that are quite suitable for rendering the thermoplastic polymer heat and color stable. Particularly useful are the phosphites which have been known to stabilize many thermoplastic polymers. In the case of aromatic polycarbonate resins, the phosphites as disclosed in U.S. Pat. No. 3,305,520 have been found to be very suitable for stabilizing clear polycarbonate resins against discoloration due to heat aging. In addition to phosphites, other materials in combination with phosphites such as tetraaryl tin compounds disclosed by Canadian Pat. 727,700 have also been useful. However, the art has been directed to stabilizing clear polycarbonate resin. It is desirable to obtain pigmented polycarbonate resins which are stable to heat and discoloration therefrom and phosphites alone are not sufficient. Therefore, it has been surprisingly discovered that a particular material used in combination with an aromatic polycarbonate resin and a phosphite results in a resin having excellent heat and color stability.

Therefore, it is an object of this invention to provide a pigmented color stable aromatic polycarbonate composition.

Another object of this invention is to provide a pigmented color stable aromatic polycarbonate composition containing therein a phosphite and boric acid.

These and other objects of this invention will become apparent from the following detailed description thereof.

Briefly, according to this invention, the foregoing and other objects are attained by incorporating in an aromatic polycarbonate resin, a pigment, an organic phosphite and boric acid. Specifically, the composition comprises an aromatic polycarbonate resin having in admixture 0.01–4.0 weight percent of a pigment, 0.001–0.5 weight percent of an organic phosphite and 0.001–0.03 weight percent of boric acid wherein these are based on the weight of the aromatic polycarbonate resin so employed. It has been found that by employing the combination of additives in admixture with an aromatic polycarbonate resin, the aromatic polycarbonate resin has excellent stability to discoloration at elevated temperatures. For example, the polycarbonate resin does not discolor in the presence of titanium dioxide when the resin is molded into useful shapes or exposed to elevated temperatures. It has been found that the phosphite alone is not sufficient to stabilize pigmented polycarbzonate resins against discoloration when exposed to elevated temperatures as during molding operations.

The following examples are set forth to illustrate more clearly the principle and practice of this invention to those skilled in the art. Unless otherwise specified, where parts or percents are mentioned, they are parts or percents by weight.

EXAMPLE I

A polycarbonate resin is prepared by reacting equimolar amounts of 2,2-bis(4-hydroxyphenyl) propane (referred to as bisphenol-A) and phosgene, which preparation and polymer are disclosed in U.S. Pat. No. 3,028,365. The polycarbonate resin so prepared as an intrinsic viscosity of 0.64 as measured in dioxane at 30° C. The polycarbonate resin so prepared is blended with the various additives so indicated in Table 1 in a laboratory mixer, dried at 250° F., and extruded into a strand which is comminuted into pellets. The pellets are then injection molded into test discs, 2″ in diameter by ⅛″ thick, and tested for yellowness in accordance with ASTM Yellowness Index Test D-1925–63T. The melt viscosity of the resin is also determined.

The amount of the additives employed with the polycarbonate resin as disclosed in Table 1 is based on the weight of the polycarbonate resin. The test discs are tested for yellowness as molded and after 48 hours exposure at 302° F. In each case, the yellowness test is run at room temperature. Melt viscosities are determined by heating the pellets to 600° F. for 20 minutes. The results are as follows:

TABLE 1

| Sample | Yellowness index As molded at 590° F. | Yellowness index 48 hours at 302° F. | Melt viscosity (poises) |
|---|---|---|---|
| (1) 1% titanium dioxide | 22.7 | 22.4 | 8,390 |
| (2) 1% titanium dioxide, 0.2% phosphite* | 19.8 | 20.8 | 7,780 |
| (3) 1% titanium dioxide, 0.2% phosphite,* 0.02% boric acid | 14.4 | 18.5 | 9,010 |
| (4) Control—polycarbonate alone | | | 8,670 |

*The phosphite is the tri(mixed monodimonylphenyl) phosphite.

EXAMPLE II

Example I is repeated except that the polycarbonate employed has an intrinsic viscosity of 0.65 and the phosphite employed is a mixture of 1 part didecylphenyl phosphite, 1 part triphenyl phosphite and 2 parts of diphenyldecyl phosphite. The results are as follows:

TABLE 2

| Sample | Yellowness index As molded at 680° F. | Yellowness index 48 hours at 302° F. | Melt viscosity (poises) |
|---|---|---|---|
| (1) 0.1% phosphite, 1% titanium dioxide | 19.3 | 21.1 | 8,910 |
| (2) 0.1% phosphite, 1% titanium dioxide, 0.01% boric acid | 12.6 | 16.5 | 9,700 |
| (3) Control—polycarbonate only | | | 10,100 |

EXAMPLE III

Example II is repeated except that the polycarbonate has an intrinsic viscosity of 0.65. The results are as follows:

TABLE 3

| Sample | Yellowness index | | Melt viscosity (poises) |
|---|---|---|---|
| | As molded at 550° F. | 48 hours at 302° F. | |
| (1) 1% titanium dioxide | 22.7 | 22.4 | 8,390 |
| (2) 1% titanium dioxide, 0.1% phosphite | 9.2 | 12.4 | 8,080 |
| (3) 1% titanium dioxide, 0.1% phosphite, 0.001% boric acid | 8.6 | 12.1 | 9,330 |
| (4) Same as 3 except 0.003% boric acid | 7.5 | 11.8 | 8,580 |
| (5) Same as 3 except 0.1% boric acid | 6.3 | 10.8 | 8,080 |
| (6) Same as 3 except 0.035% boric acid | 9.6 | 16.2 | 7,380 |
| (7) Control—polycarbonate alone | | | 8,670 |

The Yellowness Index number is an indication of discoloration of the polycarbonate due to yellowness. The lower the number, the less is the yellowness of the polycarbonate resin due to discoloration. As shown from the examples, the use of the boric acid with a pigment such as titanium dioxide and phosphite greatly reduces the yellowness of the polycarbonate resin as molded and after aging for 48 hours at 302° F. Further as shown in the examples, the melt viscosity of a polycarbonate resin is greatly reduced by the addition of phosphite and a pigment only. However, when employing boric acid along with the phosphite and pigment, the melt viscosity of the polycarbonate resin is either essentially the same as or slightly greater than the melt viscosity of a polycarbonate resin without any of the additives. This is significant since melt viscosity of a polymer is dependent on molecular weight and is therefore a measure of the mechanical properties. For example, a reduction in the melt viscosity of the polycarbonate resin by added ingredients is characteristically related to a lowering of mechanical properties as notched impact strength, etc. Therefore, it is desirable to have the combination of advantages imparted to the polycarbonate while retaining the mechanical properties thereof. This is achieved by the unique combination of the additives disclosed herein. It is this combination that is the critical feature of the instant invention and not any one separately. The examples clearly show and emphasize this criticality. Further, as shown in Table 3, when employing in excess of 0.03 weight percent of boric acid, the melt viscosity is drastically reduced and the yellowness upon heat aging increased. Thus, when employing an amount of boric acid in excess of 0.03 weight percent, adverse results are achieved.

The instant invention is directed to a pigmented color stable aromatic polycarbonate composition, which composition comprises a polycarbonate resin having in admixture therewith 0.01–4.0 weight percent of the pigment, 0.001–0.5 weight percent of an organic phosphite and 0.001–0.03 weight percent of boric acid. The weight percents of the additives are all based on the weight of the polycarbonate resin. In addition, the composition described above is also resistant to degradation as shown by the melt viscosity in the examples. The addition of the boric acid greatly enhances the melt viscosity of the polycarbonate resin which is otherwise reduced through the use of the phospite and/or the pigment alone. The addition of the phosphite is necessary since as shown in the examples, the use of titanium dioxide alone results in a greater yellowness of the test discs as molded and after aging at 302° F. for 48 hours. The phosphite has an additive benefit in that it reduces the yellowness but the boric acid even causes a further reduction in the yellowness of a polycarbonate resin. In addition, the boric acid further allows the polycarbonate resin to maintain its melt viscosity at essentially that equal to or greater than the melt viscosity of a polycarbonate resin without the pigment and/or phosphite.

The expression "organic phosphite" as used herein is meant to embrace within its scope phosphites and mixtures of phosphites conforming to the following general formulas:

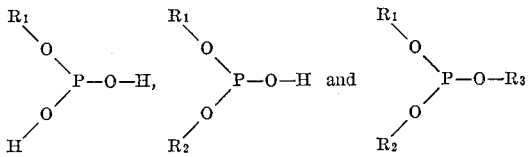

wherein $R_1$, $R_2$ and $R_3$ in each of the above formula represent organic aliphatic, monocyclic aromatic or alicyclic monocyclic hydrocarbon radicals having from 1 to 25 carbon atoms. $R_1$, $R_2$ and $R_3$ may be the same or different. As exemplary of these phosphites, there are suggested the following: dibutyl phenyl phospite, butylphosphite, diphenyl butylphosphite, diphenyl phosphite, triphenyl phosphite, hexyl phosphite, diheptyl phosphite, diphenylhexylphosphite, diphenyl nonyl phosphite, dinonylphosphite, diphenyl decyl phosphite, diphenyl dodecyl phosphite, didodecyl phosphite, 2-phenylethyl phenyl hexyl phosphite, 2-phenylethyl phosphite, di-2-phenyl methyl decyl phosphite, didecyl phenyl phosphite, di-2-ethyl decyl phenyl phosphite, tridecylphosphite, dicresyl decyl phosphite, di-(o-isooctylphenyl)-decyl phosphite, di-(dimethylphenyl)phenyl phosphite, trihexylphosphite, didecyl nonyl phosphite, di-(2-methyl-decyl)-cresyl phosphite, dicyclohexylphenyl phosphite, dicyclopentyl decyl phosphite, ditolyl decyl phosphite, tri-(p-t-octylphenyl)-phosphite, tri-(p-t-nonylphenyl)-phosphite, isobutyl dicresyl phosphite, etc.

The preferred organic phosphites for use in the practice of the present invention are triphenylphosphite, diphenyl-decyl phosphite and phenyl didecyl phosphite. The most preferred phosphite composition is a mixture of organic phosphites consisting of 1 part triphenylphosphite, 1 part phenyl didecyl phosphite and 2 parts diphenyldecyl phosphite.

The pigments employed in the practice of this invention are generally any of the pigments which are commonly used for coloring thermoplastic polymers. However, particularly useful in the practice of this invention are the metal oxide pigments which are known in the art and which are able to withstand temperatures in excess of 200° F. Such metal oxides include titanium dioxide, zinc oxide, lead oxide, lead chromate, etc. Generally, the pigments should be in the form of a finely divided powder to insure complete dispersion in the polycarbonate. In addition to the metal oxide pigment, other colorants either organic or inorganic may be added to the polycarbonate composition in order to obtain any desired coloration. Suitable colorants include nickel titanium yellow, cadmium-sulfo-selenide, strontium chromate, phthalocyanine, carbon black, naphthol red, ultramarine blue, benzidene yellow, etc.

The manner of dispersing or mixing the pigment, phosphite and boric acid to the polycarbonate is not critical. However, the process chosen should be one which results in a great degree of dispersion of all the additives uniformly throughout the polycarbonate resin. Mixing of the material, for example, may be accomplished by methods normally employed for incorporation of materials such as fillers and modifiers, etc. in any thermoplastic polymer. These methods include, for example, mixing rolls, ribbon blenders, dough mixers, Banbury mixers, extruders and other mixing equipment. The mixtures can then be formed or molded using compression molding, injection molding, calendering, or extrusion techniques. Generally, it is preferred to pre-blend the aromatic polycarbonate resin with the pigment, phosphite and boric acid in a blender. The mix is then fed to an extruder and extruded into a strand which is then comminuted into pellets. The pellets may then be employed for either compression molding, injection molding, etc.

However, it may be desirable to add the polycarbonate and additives by first dissolving both the phosphite, the boric acid and the polycarbonate in the common solvent such as methylene chloride and then evaporating the solvent to leave a residue of the phosphite and boric acid dispersed in the polycarbonate. The pigment can then be added to the stabilized composition by any of the methods mentioned above. Further a powder blend of the polycarbonate and pigment may be formed and a solution of the phosphite additive added thereto.

In general, any aromatic polycarbonate resin can be employed herein. Generally, the aromatic polycarbonates employed herein are polymers of dihydric phenols. The dihydric phenols that can be employed herein are bisphenols such as 1,1-bis(4-hydroxyphenyl)-methane, 2,2-bis(4 - hydroxyphenyl) - propane, 2,2 - bis(4-hydroxy-3-methylphenyl)-propane, 4,4-bis(4-hydroxyphenyl) - heptane, etc., dihydric phenol ethers such as bis(4-hydroxyphenyl)-ether, bis(3,5 - dichloro-4-hydroxypehnyl)-ether, etc., dihydroxy diphenyls such as p,p'-dihydroxydiphenyl, 3,3'-dichloro-4,4'-dihydroxydiphenyl, etc., dihydroxyaryl sulfones such as bis(4-hydroxyphenyl)-sulfone, bis(3,5-dimethyl-4-hydroxyphenyl)-sulfone, bis(3-methyl-5-ethyl-4-hydroxyphenyl)-sulfone, etc., dihydroxy benzenes, resorcinol, hydroquinone, halo- and alkyl-substituted dihydroxy benzenes such as 1,4-dihydroxy-2-chlorobenzene, 1,4 - dihydroxy - 2,3 - dichlorobenzene, 1,4-dihydroxy-3-methylbenzene, etc., and dihydroxy diphenyl sulfoxides such as bis(4-hydroxyphenyl)-sulfoxide, bis(3,5-dibromo-4-hydroxyphenyl)-sulfoxide, etc. A variety of additional dihydric phenols are also available to provide carbonate polymers and are disclosed in U.S. Pats. 2,999,835 and 3,028,365. It is of course possible to employ two or more different dihydric phenols or a copolymer of a dihydric phenol with glycol, a hydroxy or an acid terminated polyester, or a dibasic acid in the event a carbonate copolymer or interpolymer rather than a homopolymer is desired for use in the preparation of the aromatic carbonate polymers of this invention.

Generally, the polycarbonates employed herein may be prepared by reacting a dihydric phenol with a carbonate precursor in the presence of a molecular weight regulator and an acid acceptor. The carbonate precursors that can be used herein are either a carbonyl halide, a carbonate ester or a haloformate. The carbonyl halides which can be employed herein are carbonyl bromide, carbonyl chloride, carbonyl fluoride, etc., or mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonates such as di-(tolyl) carbonate, etc., di-(naphthyl) carbonate, di-(chloronaphthyl) carbonate, phenyl tolyl carbonate, chlorophenyl chloronaphthyl carbonate, etc. or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene is preferred.

As stated previously, the reaction may be carried out in the presence of an acid acceptor, which acid acceptor may be either an organic or an inorganic compound. A suitable organic acid acceptor is a tertiary amine and includes such materials as pyridine, triethylamine, dimethylaniline, tributylamine, etc. The inorganic acid acceptor may be one which can either be an hydroxide, a carbonate, a bicarbonate or a phosphate of an alkali or alkaline earth metal.

The molecular weight regulators which may also be employed in carrying out the process for preparing the aromatic polycarbonate resins can be such molecular weight regulators as phenol, cyclohexanol, methanol, paratertiarybutylphenol, parabromophenol, etc. Preferably, phenol is employed as the molecular weight regulator.

As can be seen from the description contained herein, the compositions of this invention find utility in areas where colored or pigmented polycarbonate resins are desired for the various esthetic qualities obtained. In addition, the boric acid greatly enhances the retention of the color imparted to the polycarbonate resin from the various pigments employed and reduces the yellowness that occurs when molding polycarbonate resin. In addition, the boric acid addition also retains the excellent qualities of the polycarbonate resin per se through maintaining its melt viscosity and thereby avoiding degradation of the polycarbonate resin. The polycarbonate composition of this invention can be used for molding various parts either by injection molding, compression molding, etc.

What is claimed is:

1. A pigmented color stable aromatic polycarbonate composition comprising an aromatic polycarbonate resin having in admixture therewith 0.01–4.0 weight percent of a pigment, 0.001–0.5 weight percent of an organic phosphite and 0.001–0.03 weight percent of boric acid, all based on the weight of the polycarbonate resin, wherein said organic phosphite is selected from the group consisting of

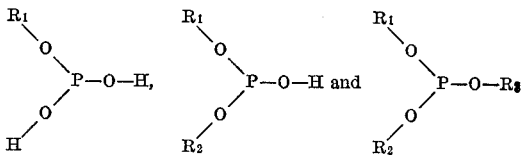

and mixtures thereof and wherein $R_1$, $R_2$ and $R_3$ are hydrocarbon radicals having from 1 to 25 carbon atoms and are independently selected from the group consisting of organic aliphatic, monocyclic aromatic and alicyclic monocyclic hydrocarbon radicals.

2. The composition of claim 1 wherein the pigment is titanium dioxide.

3. The composition of claim 1 wherein the organic phosphite is a mixture of 1 part didecylphenyl phosphite, 1 part triphenylphosphite and 2 parts diphenyldecylphosphite.

References Cited

UNITED STATES PATENTS

| | | | |
|---|---|---|---|
| 3,321,435 | 5/1967 | Fritz | 260—45.7 |
| 3,322,719 | 5/1967 | Peilstocker | 260—45.7 |

ALLAN LIEBERMAN, Primary Examiner

L. T. JACOBS, Assistant Examiner

U.S. Cl. X.R.

260—45.7